2 Sheets—Sheet 1.

T. R. FERRALL,

Assignor to H. LOUD.

SELF LUBRICATING BEARING.

No. 10,456. Reissued Mar. 4, 1884.

Witnesses

Henry Chadbourn

H. Allen

Inventor

Thomas R. Ferrall by Albert Andrews his atty.

2 Sheets—Sheet 2.

T. R. FERRALL,

Assignor to H. LOUD.

SELF LUBRICATING BEARING.

No. 10,456. Reissued Mar. 4, 1884.

Witnesses

Henry Chadbourn.

F. Allen.

Inventor

Thomas R. Ferrall.

by Albert Andrews his atty.

UNITED STATES PATENT OFFICE.

THOMAS R. FERRALL, OF BOSTON, ASSIGNOR TO HERBERT LOUD, OF EVERETT, MASSACHUSETTS.

SELF-LUBRICATING BEARING.

SPECIFICATION forming part of Reissued Letters Patent No. 10,456, dated March 4, 1884.

Original No. 272,869, dated February 27, 1883. Application for reissue filed February 4, 1884.

*To all whom it may concern:*

Be it known that I, THOMAS R. FERRALL, a citizen of the United States, residing at Boston, in the county of Suffolk and State of Massachusetts, have invented certain new and useful Improvements in Pulley-Blocks; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to improvements in self-lubricating bearings especially adapted for hoisting pulleys and blocks, although it is equally well useful for axles, shaftings, or journals of any description, as well as for trucks, wheelbarrows, &c.

The invention is carried out as follows, reference being had to the accompanying drawings, on which—

Figure 1:
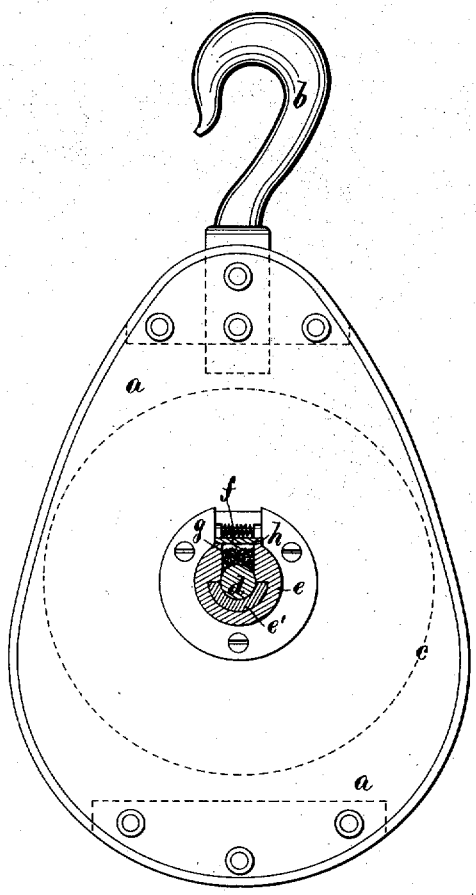
Figure 2:
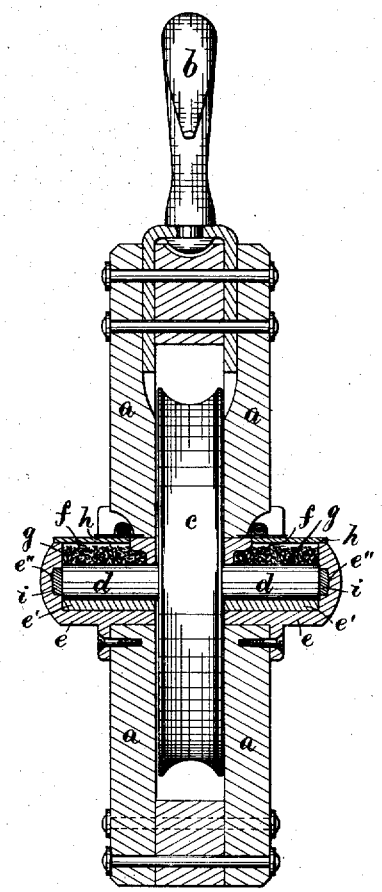
Figure 3:
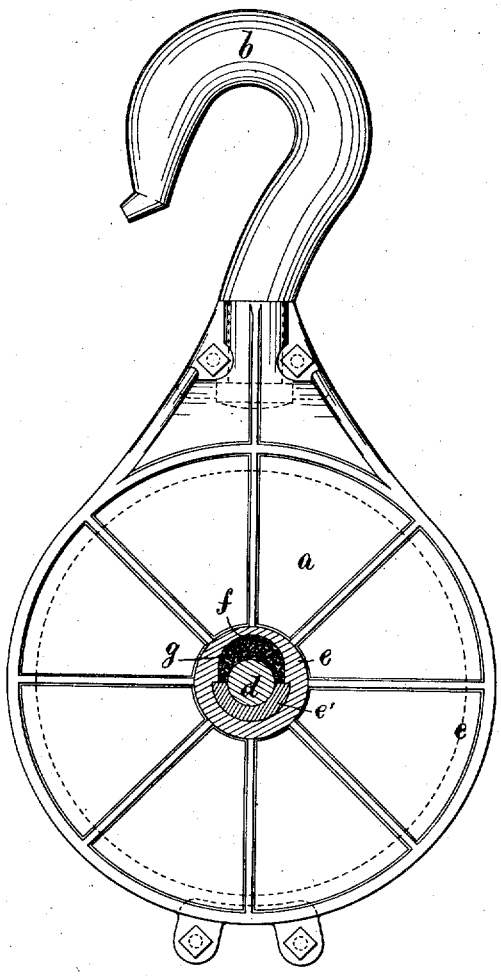
Figure 4:
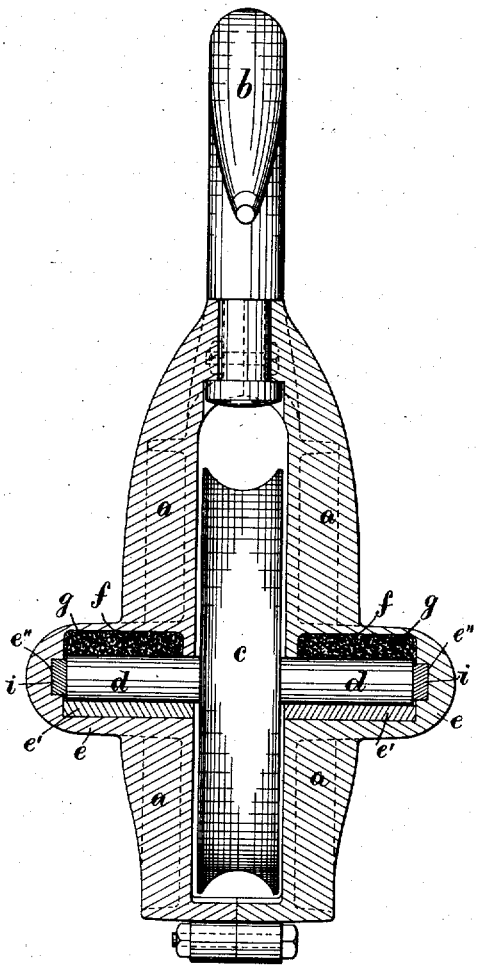

Figure 1 represents a side elevation of a wooden hoisting-block provided with my improved self-lubricating bearings, and Fig. 2 represents a central longitudinal section of the same. Fig. 3 represents a side elevation of a metal hoisting-block provided with my improved self-lubricating bearings, and Fig. 4 represents a central longitudinal section of the same.

Similar letters refer to similar parts wherever they occur on the different parts of the drawings.

In Figs. 1 and 2, *a a* represent the cheek or side pieces of a hoisting-block, which pieces are made of wood, and secured together at top and bottom at a sufficient distance apart by means of rivets or equivalent devices, as usual.

*b* is the swivel-hook in the upper end of the block, as usual.

*c* represents the sheave or pulley, which is secured to the central spindle, *d*, and adapted to run loosely and without much friction in the improved self-lubricating bearings. The said improved self-lubricating bearings are each composed of a metal shell or case, *e*, that is secured in a suitable manner to the outer surface of the wooden cheek-piece *a* of the block, and provided on its under side with a semicircular bushing, *e'*, for the spindle *d* to run in; but such bushing *e'* may be dispensed with, if so desired, and the spindle *d* be made to run directly in the shell *e*, if so desired, without departing from the spirit of my invention. The upper portion of each bearing or shell *e* is provided with a chambered-out portion, *f*, adapted to receive and contain the lubricant *g*—such as, for instance, a mixture of tallow and graphite or other suitable lubricating material, as may be desired.

*h* is a swinging cover, adapted to cover the chambered-out portion *f* when the block is in use; but such cover may be dispensed with, if so desired. In the end of each bearing *e* is arranged within a suitable end recess, *e''*, as shown in Figs. 2 and 4, a piece of rawhide, *i*, or other similar wear-resisting material for the purpose of preventing a lateral motion of the spindle *d* during the use of the hoisting-pulley.

Figs. 3 and 4 show the improved self-lubricating bearing as applied to a metal-frame hoisting-pulley. In said figure *a a* represent the cheek or side pieces, which are made of cast-iron or cast metal, and on such a metal block I prefer to cast the metal shell or case *e* for each bearing in one piece with its metal cheek or side pieces *a*, and to provide it with a semicircular bushing, *e'*, chamber *f*, and lubricant *g*, in a similar manner to what is herein above described, with this modification, however, that when the cheek-pieces *a a* are of metal, I prefer to make each bearing shell or case *e* as an annular hub cast in one piece, with its corresponding cheek-piece *a*, as shown in Figs. 3 and 4, without any external opening or orifice whatever, so as to more properly protect the bearing and its lubricant from dust, rain, or snow.

A closed shell or case, *e*, as shown in Figs. 3 and 4, may also be applied, if so desired, to blocks of the kind shown in Figs. 1 and 2, and the open shell or case *e*, as shown in Figs. 1 and 2, may also be cast in one piece with each cheek-piece of a metal-frame block to equal advantage.

In the pulley-blocks, as shown in the drawings, it will be seen that the bearings *e e* are made to project outside of the cheek-pieces *a a*, and this is very advantageous in hoisting-blocks, as by so doing I am enabled to use a very narrow sheave to prevent the rope from being flattened, and at the same time to obtain bearings of sufficient lengths and of the proper wearing-surfaces for the spindle *d*, which could not be accomplished in blocks where the ends of the bearings are flush with the side pieces of the block.

The sheave *c* is secured to the spindle *d*, and constitutes, as it were, one solid piece, and consequently the sheave may be as narrow as one may desire; and to provide the proper bearing-surfaces for the said spindle, so as to enable a heavy load to be raised with said block without undue strain on the spindle or its bearings, I make the latter projecting in a longitudinal direction beyond the outside of each of the cheek-pieces *a a*, as shown.

What I wish to secure by Letters Patent and claim is—

1. The herein-described self-lubricating bearing, consisting of the metal shell or case *e*, chamber *f*, adapted to contain the lubricant *g*, and having end recess, *e''*, with its cushion or material *i*, as and for the purpose set forth.

2. In combination with the shell *e* and the chamber *f*, adapted to contain the lubricant *g*, the semicircular bushing *e'*, as and for the purpose set forth.

3. In a pulley-block having wood or metal side pieces, *a a*, as shown, the bearings *e e*, projecting outside of the side pieces, *a a*, as and for the purpose set forth.

4. In a pulley-block, the sheave *c*, secured to spindle *d*, and made to revolve with the latter, in combination with the wood or metal side pieces, *a a*, and outwardly-projecting bearings *e e*, projecting beyond said side pieces *a*, *a*, as and for the purpose set forth.

In testimony whereof I have affixed my signature in presence of two witnesses.

THOMAS R. FERRALL.

Witnesses:

ALBAN ANDRÉN,

E. DEF. BLOSSOM.